Aug. 22, 1967     E. SAVARY     3,336,715
RIGID FRAME FOR QUADRANGULAR-SHAPED BAY
Filed Feb. 19, 1965     2 Sheets-Sheet 1
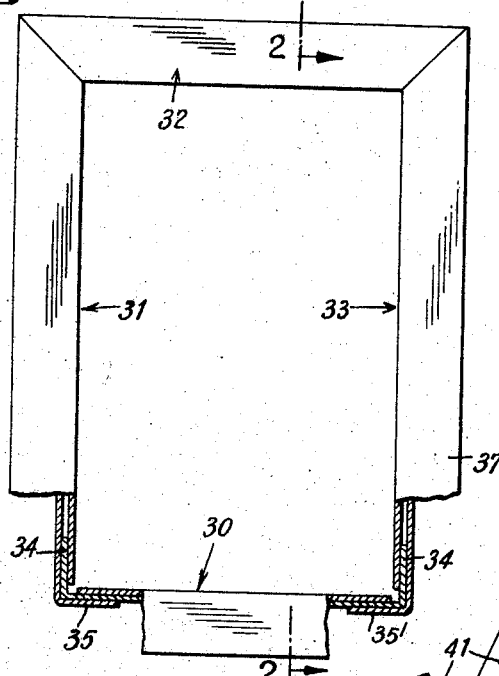
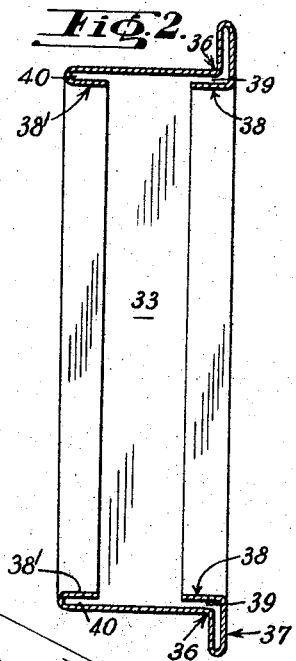
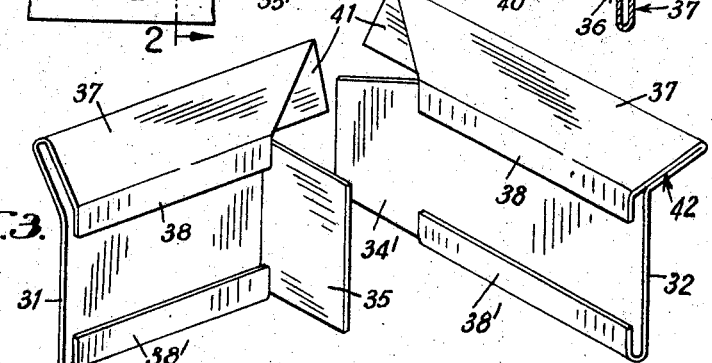
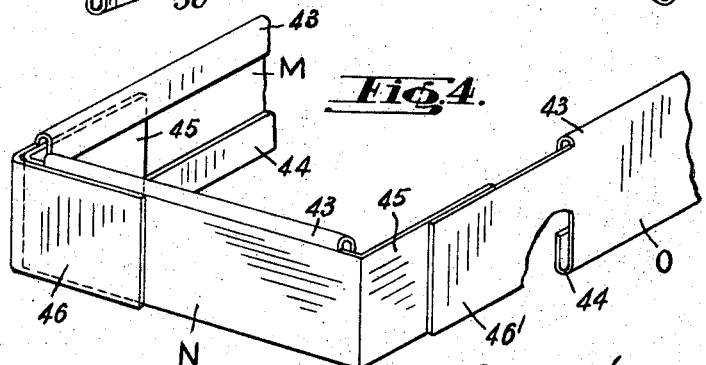
Emile Savary, Inventor
By Wenderoth, Lind & Ponack, Attys

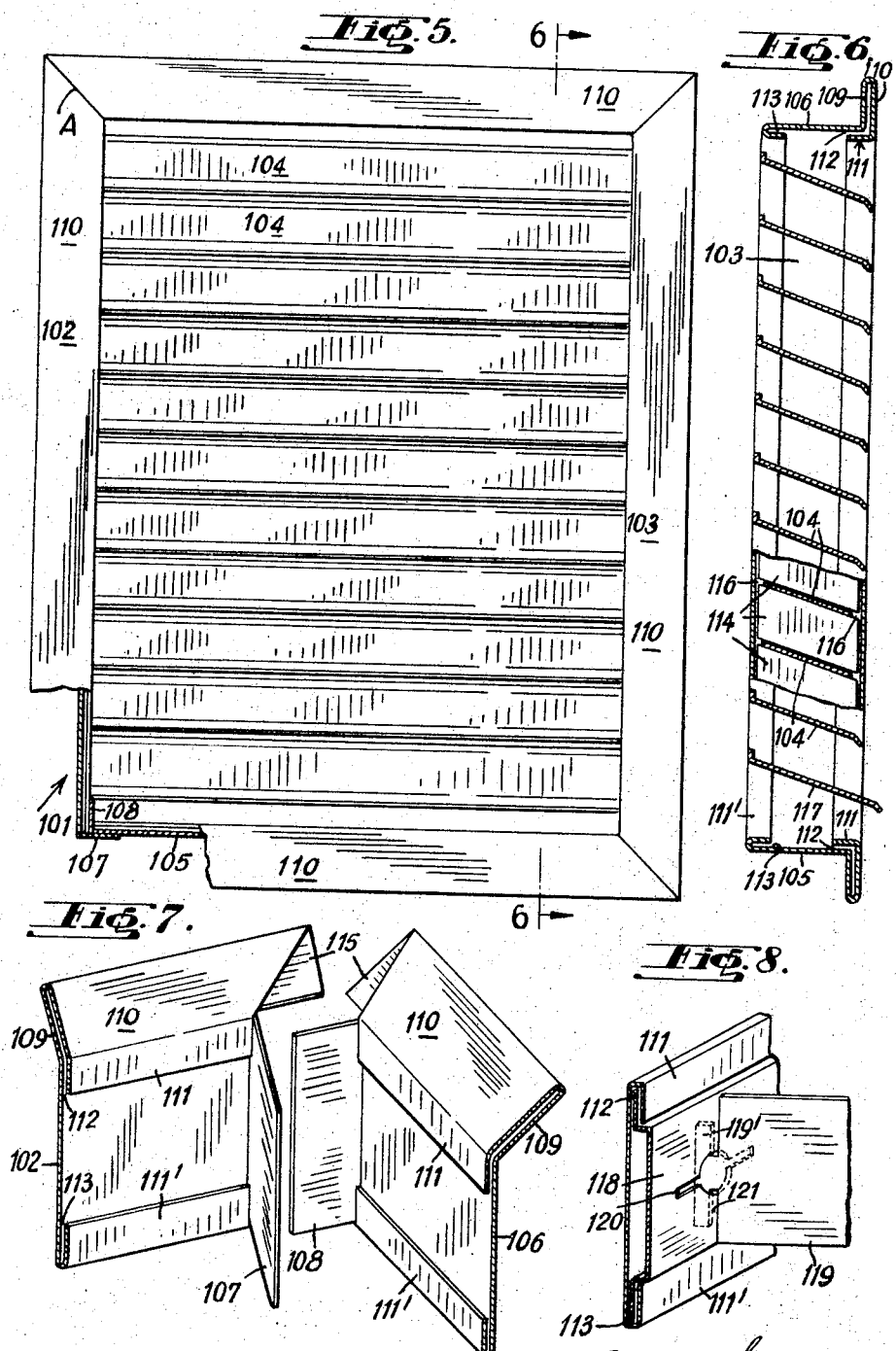

United States Patent Office 3,336,715
Patented Aug. 22, 1967

3,336,715
RIGID FRAME FOR QUADRANGULAR-SHAPED BAY
Emile Savary, Romont, Switzerland, assignor of one-half to Henri Bersier, Bulle, Switzerland
Filed Feb. 19, 1965, Ser. No. 433,878
Claims priority, application Switzerland, Feb. 21, 1964, 2,153/64
3 Claims. (Cl. 52—473)

The present invention has for object a rigid frame for a quadrangular-shaped bay. This frame is characterized by the fact that each side is constituted by sheet-metal the ends of which are folded at right angles, one of the folded ends of two adjacent sides being located inside the angle of the frame and the other on the outside, and by the fact that at least two of its parallel sides have each, edges folded inwardly so as to form slides in which engage at least one folded end of an adjacent side, the whole being rigidly held solely by folding.

In a particular embodiment, the slides of the two parallel sides of the frame serve to receive slidably securing means for ventilation vanes parallel to each other and to the two other sides of said frame so as to produce a ventilating grid.

The aim of the invention is to provide a frame of particularly simple construction, having the advantage of requiring no weld or rivet, all the members which constitute this frame being held rigidly solely by folding.

The accompanying drawing shows, by way of example, several embodiments of the frame forming the object of the present invention.

FIGURE 1 is a plan view of the frame.
FIGURE 2 is a section along line 2—2 of FIG. 1.
FIGURE 3 is a broken view in perspective on a larger scale of a detail of the frame.
FIGURE 4 is a view in perspective of a part of a frame according to a variant.
FIGURE 5 is a plan view of a ventilating grid according to another embodiment.
FIGURE 6 is a section along line 6—6 of FIG. 5.
FIGURE 7 is a broken view in perspective on a larger scale of details of the grid.
FIGURE 8 is a partial view in perspective of a variant.

The frame shown in FIGS. 1 to 3 is provided for a rectangular-shaped bay and each side 30, 31, 32 and 33 of this frame is constituted by folded sheet-metal, having ends folded at right angles 34, 35, 34' and 35' respectively. The folded end 34 of the side 30 is located inside the angle E of the frame, the folded end 35 of the adjacent side 31 being located outside the frame.

One of the edges of the sides of the frame is folded outwardly at 36 and folded over itself at 37 so as to form a flat peripheral rim around the frame. The inner end of this rim 37 is folded at 38 over the inner wall of the frame or sides 30, 31, 32 and 33, so as to form a slide 39 along each side. The other edge of the sides is also folded at 38' towards the inside of the frame to form a slide 40 on the sides of the frame, similar to the slide 39. The two slides 39 and 40 of each of the parallel sides 31 and 33 are adapted to receive slidably an end 34 folded at right angles of the side 30. The folded ends 35 and 35' of the sides 31 and 33 respectively are engaged in the slides 39 and 40 of the side 32 the ends 34' of which are folded outside the sides 31 and 33.

Each side of the frame is moreover provided with projecting parts 41 serving to secure the angles of the rim 37. The part 41 of the side 32 fits into the corresponding fold of the folded sheet-metal of the adjacent side 31, and the part 41 of this side 31 bears under the part 41 of the side 32 or vice versa. In order that the rims 37 of the sides 31 and 32 be in the same plane, the rim of the side 32 is flattened so as not to offer any free space between the two thicknesses of metal as shown at 42 in FIG. 3.

The mounting of the frame described is carried out in the following manner:

One first of all assembles the sides 31 and 33 on the side 32 by engaging the folded ends 35 and 35' of the sides 31 and 33 respectively in the slides 39 and 40 of the side 32, then one engages the folded ends 34 of the side 30 in the slides of the sides 31 and 33, the ends 35 and 35' not yet being folded. Finally one folds the ends 34' of the side 32 outside the sides 31 and 33 and the ends 35, 35' outside the side 30 to hold it in place. The frame described, as a whole, is thus held rigid solely by folding.

In the variant shown in FIG. 4, the frame has no flat peripheral rim. Each side of this frame has, like the side M, edges 43, 44 folded inwardly forming slides in which is engaged the end 45 folded at right angles of the adjacent side N. The end 46 of side M is folded at right angles outwardly of the side N. The side O is shown with its end 46' not yet folded to permit the insertion of the folded end 45 of the side N in the slides 43, 44 of this side O.

The folded edges 43 and 44 also serve to give the necessary rigidity to each side of the frame and the assembly of the four sides carried out as in the preceding example permits of producing a rigid frame.

The frame described has the advantage of being of particularly simple construction, all the members constituting the same being held rigid solely by folding.

The embodiment shown in FIGS. 5 to 7 includes a ventilating grid formed by a rigid frame similar to the frame described above, supporting between two sides 102 and 103 vanes 104 parallel to each other and to the two other sides 105 and 106 of the frame.

Each side of the frame is also here constituted by folded sheet-metal, provided as shown in FIG. 7, with ends 107 and 108 folded at right angles. The folded end 107 of the side 102 is located inside the angle A of the frame and the folded end 108 of the adjacent side 106 being located outside the frame.

As in the preceding embodiment, the sides of the frame are folded outwardly at 109 to form a flat peripheral rim 110 around the frame. The inner end of this rim 110 is folded at 111 over the inner wall of the frame at the sides 102, 103, 105 and 106, to form a slide 112 along each side. The other edge of the sides is also folded at 111' towards the inside of the frame to form a slide 113 on the sides 102 and 103, similar to the slide 112, these two slides being adapted to receive slidably the ends 114 folded at right angles of the vanes 104 (FIG. 6). The rims 111' of the sides 105 and 106 may serve as a support for a trellis and, to this end, be provided with slots.

Each side of the frame is moreover provided with projecting parts 115 serving to secure the angles of the rim 110. The part 115 of the side 102 fits into the corresponding fold of the sheet-metal on the adjacent side 106, and the part 115 of this side 106 bears under the part 115 of the side 102 or vice versa, the rim 110 of this side being flattened to come into the same plane as the adjacent rim of the side 102.

The vanes 104 are each formed by a rectilinear edge ending in the folded parts 114 in the shape of a parallelogram, notches 116 being provided between the folded ends 114 and the edge of the vane for the passage of these ends in the slides 112 and 113. The parallelogram shape given to the folded ends 114 serves to maintain the vane 104 inclined relative to the plane of the frame as shown in FIG. 6. The lower vane overreaches the plane of the frame at 117 and serves for the evacuation of water.

The assembly of the ventilation grid described is carried out in the following manner:

One first of all assembles the sides 102, 103 and 106 then one slides the folded ends 114 of the vanes 104 in the slides 112 and 113, these ends abutting one against the other. After the insertion of the last vane 117 for the evacuation of water, the fourth side 105 of the frame is positioned with its folded ends 108 inside the frame and the ends 107 of the two sides 102 and 103 are folded above the side 105 to hold it in place. The grid described, as a whole, is thus held rigid solely by folding.

In the variant shown in FIG. 8, the sides of the frame do not have a flat rim 110 as in the preceding embodiment but simply the folded edges 111 and 111' to form the slides 112 and 113. A dished plate 118 is mounted slidably in the slides 112 and 113 of two parallel sides of the frame, this plate 118 serving as a support for the swivelling vanes 119 and having, to this end, lengthened openings 120 in the direction of the longitudinal axis of the corresponding side. The length of these openings 120 is such that the end 119' of the vane 119 may be engaged in the opening and then pivoted to the transverse position shown in dotted lines behind the plate 118. To permit this pivoting of the vane 119, the opening 120 has an enlarged circular central part, the diameter of which corresponds to the notch base 121 provided in the vane 119 to form the end 119'.

Means could be provided to control in known manner the inclination of all the vanes at the same time.

In the case where each vane 119 is adjusted separately in inclination, one could provide, preferably, a rubber washer between the end 119' and the plate 118. This would permit, on the one hand, of maintaining the vane in the desired direction and on the other hand, of absorbing the noises due to possible vibrations.

It is obvious that instead of inserting one by one the vanes in the slides of the frame, one could form a train or battery of vanes which one would insert as a block in the said slides of the frame.

The ventilation grid described has the advantage of being of particularly simple construction, not requiring any weld or rivet, all the members which constitute the same being held rigid solely by folding.

What I claim is:

1. A rigid frame for a quadrangular-shaped bay comprising four sheet metal sides, each side having its ends folded at right angles, one of the folded ends of two adjacent sides being located inside the angle of the frame and the other on the outside, at least two of its parallel sides each having edges folded inwardly to form slides in which engage at least one folded end of an adjacent side, the whole being rigidly held solely by folding, one of the edges of said sides being folded outwardly and folded over itself to form a flat peripheral rim around the frame, one end of said rim being folded over the frame to form one of said slides, and each of said sides having projecting parts serving to secure the angles of said rim, the projecting part of one side fitting into the corresponding fold of the folded adjacent side whose projecting part bears under the corresponding part of the side first mentioned.

2. A frame according to claim 1 wherein vanes parallel to each other and to the other two sides of said frame are provided between two of said sides to form a ventilating grid, the slides of said two parallel sides slidably receiving securing means for said vanes.

3. A frame as set forth in claim 2 wherein said vanes are provided with folded ends abutting one another.

References Cited

UNITED STATES PATENTS

| | | | |
|---|---|---|---|
| 1,150,455 | 8/1915 | Rudolph et al. | |
| 1,545,123 | 1/1925 | Burhorn | 52—473 X |
| 1,968,890 | 8/1934 | Huff | 160—381 X |
| 2,023,604 | 12/1935 | Lovejoy | 287—189.36 |
| 2,484,769 | 10/1949 | Wolters | 52—473 X |
| 2,552,982 | 5/1951 | Lambert | 52—473 X |
| 2,835,001 | 5/1958 | Matthews | 52—473 |
| 2,844,233 | 7/1958 | Westman | 287—189.36 |
| 3,121,481 | 2/1964 | Johnson | 52—473 X |
| 3,205,599 | 9/1965 | Spertus | 287—189.36 |

DAVID J. WILLIAMOWSKY, *Primary Examiner.*

HARRISON R. MOSELEY, *Examiner.*

P. C. KANNAN, *Assistant Examiner.*